United States Patent
Ogura et al.

(10) Patent No.: US 12,202,990 B2
(45) Date of Patent: Jan. 21, 2025

(54) AQUEOUS INK COMPOSITION FOR BALLPOINT PEN

(71) Applicant: MITSUBISHI PENCIL COMPANY, LIMITED, Shinagawa-ku (JP)

(72) Inventors: Kousuke Ogura, Shinagawa-ku (JP); Akiko Hirayama, Shinagawa-ku (JP); Takashi Hamazaki, Shinagawa-ku (JP)

(73) Assignee: MITSUBISHI PENCIL COMPANY, LIMITED, Shinagawa-ku (JP)

(*) Notice: Subject to any disclaimer, the term of this patent is extended or adjusted under 35 U.S.C. 154(b) by 718 days.

(21) Appl. No.: 17/421,763

(22) PCT Filed: Feb. 19, 2020

(86) PCT No.: PCT/JP2020/006488
§ 371 (c)(1),
(2) Date: Jul. 9, 2021

(87) PCT Pub. No.: WO2020/175265
PCT Pub. Date: Sep. 3, 2020

(65) Prior Publication Data
US 2022/0025197 A1    Jan. 27, 2022

(30) Foreign Application Priority Data
Feb. 25, 2019   (JP) ................. 2019-031478

(51) Int. Cl.
*C09D 11/18* (2006.01)
*B43K 7/00* (2006.01)
*C08K 3/22* (2006.01)

(52) U.S. Cl.
CPC .............. *C09D 11/18* (2013.01); *B43K 7/00* (2013.01); *C08K 2003/2241* (2013.01)

(58) Field of Classification Search
CPC ..................................................... C09D 11/18
USPC ......................................................... 523/161
See application file for complete search history.

(56) References Cited

U.S. PATENT DOCUMENTS

| | | | |
|---|---|---|---|
| 6,387,964 B1 | 5/2002 | D'Agostino et al. | |
| 6,387,984 B1 | 5/2002 | Ito | |
| 6,492,435 B1 | 12/2002 | Miyamoto et al. | |
| 2005/0042429 A1 | 2/2005 | Iwamoto et al. | |
| 2005/0043439 A1 | 2/2005 | Iwamoto et al. | |
| 2019/0010344 A1 | 1/2019 | Ichikawa et al. | |
| 2019/0338151 A1* | 11/2019 | Arisawa ................. | C08K 3/013 |

FOREIGN PATENT DOCUMENTS

| | | | | |
|---|---|---|---|---|
| CN | 1255155 A | 5/2000 | | |
| EP | 3211046 A1 * | 8/2017 | ............... | B43K 7/00 |
| EP | 3 401 368 A1 | 11/2018 | | |
| JP | 8-143807 A | 6/1996 | | |
| JP | 8-311148 A | 11/1996 | | |
| JP | 10-219176 A | 8/1998 | | |
| JP | 11-35867 A | 2/1999 | | |
| JP | 11-193363 A | 7/1999 | | |
| JP | 2000-248216 A | 9/2000 | | |
| JP | 2002-256179 A | 9/2002 | | |
| JP | 2003-226828 A | 8/2003 | | |
| JP | 2005-29729 A | 2/2005 | | |
| JP | 2005-36156 A | 2/2005 | | |
| JP | 2006-193717 A | 7/2006 | | |
| JP | 2007-177011 A | 7/2007 | | |
| JP | 2007-518838 A | 7/2007 | | |
| JP | 2008-1832 A | 1/2008 | | |
| JP | 2009-161654 A | 7/2009 | | |
| JP | 2009-185167 A | 8/2009 | | |
| JP | 2011-178973 A | 9/2011 | | |
| JP | 2015-229708 A | 12/2015 | | |
| JP | 2017-115084 A | 6/2017 | | |
| JP | 2017-155161 A | 9/2017 | | |
| JP | 2017-210547 A | 11/2017 | | |
| JP | 2018-104579 A | 7/2018 | | |
| WO | WO-2018083824 A1 * | 5/2018 | ............... | B43K 1/08 |

OTHER PUBLICATIONS

Extended European Search report issued Nov. 4, 2022 in European Patent Application No. 20763655.6, 7 pages.
International Search Report issued on May 12, 2020 in PCT/JP2020/006488 filed on Feb. 19, 2020, 3 pages.

* cited by examiner

*Primary Examiner* — Deve V Hall
(74) *Attorney, Agent, or Firm* — Oblon, McClelland, Maier & Neustadt, L.L.P.

(57) ABSTRACT

An ink composition for an aqueous ballpoint pen may have excellent ink discharging performance even if a pen point is exposed for a long period of time. Such an ink composition may contain at least from 1 to 35 mass % of titanium oxide having an average particle size of greater than 0.1 um and smaller than or equal to 1 μm, and from 1 to 35 mass % of non-tacky urethane particles having an average particle size from 0.1 to 6 μm.

2 Claims, No Drawings

AQUEOUS INK COMPOSITION FOR BALLPOINT PEN

CROSS-REFERENCE TO RELATED APPLICATIONS

The present application is the national stage of international application PCT/JP2020/006488, filed on Feb. 19, 2020, and claims the benefit of the filing date of Japanese Appl. No. 2019-031478, filed on Feb. 25, 2019.

TECHNICAL FIELD

The present invention relates to an aqueous ink composition for a ballpoint pen, the composition having excellent ink discharging performance even when a pen point is exposed for a long period of time.

BACKGROUND ART

Conventionally, when the cap of a ballpoint pen using an ink composition containing titanium oxide is taken off for a certain period of time, ink discharging performance may get decreased. It is supposed that volatilization of water around the ball lowers dispersion performance of titanium oxide, leading to aggregation.

It has been first confirmed from the experimental results obtained by the present inventors that when urethane particles having a specific physical property are added to such an ink composition containing titanium oxide, the discharging performance is improved.

Meanwhile, many documents regarding inventions of ink compositions for a ballpoint pen containing titanium oxide have been filed. These documents include those describing urethane emulsion as an optional component such as a fixing agent (bonding agent) or a dispersant (hereinafter, such documents are referred to as "Document Group A") and those describing urethane particles as an essential component and titanium oxide as an optional component such as a coloring material (hereinafter, such documents are referred to as "Document Group B").

Examples of the documents of Document Group A include:

1) An aqueous ink composition containing at least titanium oxide, a binder resin, a viscosity modifier, a polymeric anti-settling agent, and water, wherein the ink viscosity is from 3000 to 50000 centipoise; and the polymeric anti-settling agent is dextran (see, for example, Patent Document 1);

2) An aqueous ink composition containing an emulsion containing a colorant (such as titanium oxide), a dispersant, a viscosity modifier, water, and an oil-soluble silicone (see, for example, Patent Document 2)

3) An aqueous ink composition for a ballpoint pen, wherein an aqueous ink composition, which includes titanium oxide as a white pigment and a viscosity modifier, contains flat-shaped resin particles (see, for example, Patent Document 3)

4) An aqueous ink composition having a high masking property containing at least titanium oxide, a binder, a solvent, and a thickener, wherein the binder is a cationic binder; and the thickener is polyethylene oxide (see, for example, Patent Document 4);

5) An aqueous ink composition for a fine pointed ballpoint pen, which contains at least water, a colorant, and a water soluble solvent, blended with one or more species of ultra fine particles selected from the group consisting of alumina, titanium oxide, silica, silicon carbide, and tungsten carbide, each having a particle diameter of less than 0.1 μm, wherein a blending amount of the ultra fine particles is from 0.002 to 2 wt % of the ink composition; and the use of a water-dispersible emulsion such as urethane resin as a dispersant (see, for example, Patent Document 5)

6) An aqueous ink composition for a ballpoint pen containing at least water, titanium oxide, and a surfactant, wherein the titanium oxide has an average particle size from 1 to 95 nm; and the surface of the titanium oxide is treated with a surfactant (see, for example, Patent Document 6);

7) An aqueous ink composition for a ballpoint pen containing at least titanium oxide, hollow resin particles, a water-soluble resin, a resin emulsion, and a phosphate ester-based surfactant, wherein, relative to the total mass of the ink composition, a content of the titanium oxide is from 0.1 to 10.0 mass %; and a total content of the titanium oxide and the hollow resin particles is from 5.0 to 25.0 mass % (see, for example, Patent Document 7); and 8) An aqueous ink composition for a writing instrument containing pigment particles, a extender material, an aggregate dispersant such as an alkylol ammonium salt of a polybasic acid, an aggregation control agent such as a cellulose derivative, a self-crosslinking resin emulsion such as a urethane emulsion, polyolefin resin particles, and a solvent, with an object to provide an ink composition for a writing instrument having excellent re-dispersion performance as well as excellent handwriting fixability and abrasion resistance even when being used on an impermeable writing surface (see, for example, Patent Document 8).

Further, examples of the documents of Document Group B include:

9) A shear-thinning aqueous ink composition for a ballpoint pen containing, as essential components, (a) from 1 to 35 wt. ° of a colorant, (b) from 2 to 35 wt. % of a water-soluble polar solvent, (c) from 1 to 30 wt. % of a nonionic surfactant selected from the range of a HLB value of 8 to 12, and (d) a self-emulsifying aqueous dispersion resin having an acid number of a resin component of 15 or less and being neutralized with a basic substance, wherein an ionomer type polyurethane resin or the like is added as the aqueous dispersion resin in a ratio from 0.1 to 10 parts by weight with respect to 1 part by weight of the colorant; the balance is water and an adjusting additive; a viscosity of the shear-thinning aqueous ink composition for a ballpoint pen is in the range of 25 to 160 mPa·s (values measured with an EM type rotational viscometer at a rotational speed of 100 rpm and at 25° C.); and a shear-thinning index of the shear-thinning aqueous ink composition for a ballpoint pen is in the range from 0.1 to 0.7 (see, for example, Patent Document 9)

10) An aqueous composition for writing and drawing containing a resin emulsion, wherein a resin emulsion A, which has a difference between the minimum film forming temperature (MFT) and the glass transition temperature (Tg) of 15° C. or higher, is contained as the resin emulsion in an amount from 0.01 to 60 wt. % as a solid content with respect to the total amount of the ink composition; a resin emulsion B, which has at least minimum film forming temperature (MFT) or glass transition temperature (Tg) at higher than 25° C., is contained as the resin emulsion in an amount of at least 20 wt. % as a solid content with respect to the total amount of the ink composition; and the resin emulsions A and B are selected from the group consisting of an acrylic resin emulsion, a styrene acrylic resin emulsion, and a urethane resin emulsion (see, for example, Patent Document 10); and 11) An aqueous ink composition for a writing instrument containing at least a pigment, water, and a polycarbonate polyol-copolymerized urethane emulsion. (see, for example, Patent Document 11).

However, Patent Document 1 of the aforementioned Document Group A has an object of obtaining a flexible and strong handwriting with no sedimentation and separation over time and is intended for a correction fluid having from 30 to 70 wt. % of titanium oxide. The use of a urethane emulsion as a binder resin (water-dispersible resin) to form a film of handwriting is merely mentioned without being described in any specific example. Furthermore, there is no description of a urethane emulsion in the examples, only the description of the use of a styrene-acrylic acid copolymer and a polyacrylic acid polymer. It can be said that the invention of Patent Document 1 differs from the present invention in terms of the object, the problem, and the technical idea (configuration as well as actions and effects based on the configuration).

Patent Document 2 has an object of suppressing changes over time in the coloring density of a coating film. The use of a urethane emulsion as a dispersant is merely mentioned without being described in any specific example. There is also no description of a urethane emulsion in the examples, only the description of the use of a silicone emulsion. It can be said that the invention of Patent Document 2 differs from the present invention in terms of the object, the problem, and the technical idea (configuration as well as actions and effects based on the configuration).

Although Patent Document 3 uses titanium oxide as a white pigment, the object is to prevent precipitation of titanium oxide and to achieve a high masking property of the handwriting and excellent ink outflow. There is no description or suggestion of urethane resin particles as the flat-shaped resin particles. The use of a urethane emulsion as a dispersant is merely mentioned without being described in any specific example. There is also no description of a urethane emulsion in the examples, only the description of styrene resin particles being used as the flat-shaped resin particles. It can be said that the invention of Patent Document 3 differs from the present invention in terms of the problem and the technical idea (configuration as well as actions and effects based on the configuration).

Patent Document 4 has an object of obtaining excellent bleeding resistance against oil-based ink handwriting and is intended for a correction fluid having from 15 to 80 wt. % of titanium oxide. Although the use of a urethane emulsion as a cationic binder is described, the use of a urethane emulsion in Examples 4 and 5 is to form a film by tackiness (formation of a high masking property). It can be said that the invention of Patent Document 4 differs from the present invention in terms of the object, the problem, and the technical idea (configuration as well as actions and effects based on the configuration).

Patent Document 5 has an object of suppressing wear and the like of a ball in order for an aqueous ink composition to be used in a fine pointed ballpoint pen having a ball diameter of not greater than 0.4 mm. Therefore, ultra fine particles such as titanium oxide having a particle diameter of less than 0.1 μm are selected. The use of a urethane emulsion as a dispersant is merely mentioned without being described in any specific example, and the use of a urethane emulsion is nowhere to be found in the examples. It can be said that the invention of Patent Document 5 differs from the present invention in terms of the object, the problem, and the technical idea (configuration as well as actions and effects based on the configuration).

Patent Document 6, which uses titanium oxide having an average particle diameter from 1 to 95 nm, has an object of achieving dispersion stability of titanium oxide and suppressing wear and the like of a ball. The use of a urethane emulsion as a dispersant is merely mentioned without being described in any specific example, and the use of a urethane emulsion is nowhere to be found in the examples. It can be said that the invention of Patent Document 6 differs from the present invention in terms of the problem and the technical idea (configuration as well as actions and effects based on the configuration).

Patent Document 7 has an object of achieving excellent handwriting visibility immediately after writing and handwriting fixability. The use of a urethane resin as hollow resin particles and a resin emulsion is merely mentioned without being described in any specific example and is nowhere to be found in the examples. It can be said that the invention of Patent Document 7 differs from the present invention in terms of the object, the problem, and the technical idea (configuration as well as actions and effects based on the configuration).

Patent Document 8 has an object of achieving excellent re-dispersion performance as well as excellent handwriting fixability and abrasion resistance even when being used on an impermeable writing surface. Although the use of a urethane resin as a self-crosslinking resin emulsion is described, the self-crosslinking resin emulsion is used to form a film by tackiness (formation of handwriting fixability and abrasion resistance). It can be said that the invention of Patent Document 8 differs from the present invention in terms of the object, the problem, and the technical idea (configuration as well as actions and effects based on the configuration).

Further, Patent Document 9 of the aforementioned Document Group B discloses that an ionomer type polyurethane resin used as an aqueous dispersion resin is used as a liquid. It can be said that the invention of Patent Document 9 differs from the present invention in terms of the object, the problem, and the technical idea (configuration as well as actions and effects based on the configuration).

Patent Document 10 has an object of obtaining a handwriting and a coating film with crackles. Although the use of a urethane resin emulsion as resin emulsions A and B is described, this resin emulsion is used to form a film by tackiness (formation of handwriting fixability and abrasion resistance). It can be said that the invention of Patent Document 10 differs from the present invention in terms of the object, the problem, and the technical idea (configuration as well as actions and effects based on the configuration).

Patent Document 11 has an object of achieving excellent re-dispersion performance as well as excellent handwriting fixability and abrasion resistance even when being used on an impermeable writing surface. Although the use of a urethane resin as a self-crosslinking resin emulsion is described, the self-crosslinking resin emulsion is used to form a film by tackiness (formation of handwriting fixability and abrasion resistance). It can be said that the invention of Patent Document 11 differs from the present invention in terms of the object, the problem, and the technical idea (configuration as well as actions and effects based on the configuration).

As such, regarding ballpoint pens using ink compositions containing titanium oxide in Patent Documents 1 to 8 of Document Group A and Patent Documents 9 to 11 in Document Group B above, there is no description of or suggestion on improving deteriorated ink discharging performance, which happens when the cap of a ballpoint pen is taken off for a certain period of time, by adding urethane particles having a specific physical property.

CITATION LIST

Patent Document

Patent Document 1: JP 8-143807 A (claim 1, paragraph 0007, and Examples)
Patent Document 2: JP 11-35867 A (such as claim 1, claim 5, and paragraph 0024)
Patent Document 3: JP 11-193363 A (such as claim 1, claim 12, and paragraph 0044)
Patent Document 4: JP 2000-248216 A (such as claim 1 and paragraph 0009)
Patent Document 5: JP 2007-518838 A (such as claim 1 and paragraph 0015)
Patent Document 6: JP 2009-161654 A (such as claim 1 and paragraph 0029)
Patent Document 7: JP 2009-185167 A (such as claim 1, paragraph 0015, and paragraph 0023)
Patent Document 8: JP 2017-115084 A (such as claim 1, claim 2, and paragraph 0036)
Patent Document 9: JP 10-219176 A (such as claim 1, claim 7, and Examples)
Patent Document 10: JP 2006-193717 A (such as claim 1, claim 7, and Examples)
Patent Document 11: JP 2008-1832 A (such as claim 1 and paragraph 0006)

SUMMARY OF INVENTION

Technical Problem

In light of the problems and circumstances of prior art, an object of the present invention is to provide an aqueous ink composition for a ballpoint pen, the composition having excellent ink discharging performance even if a pen point is exposed for a prolonged period of time.

Solution to Problem

As a result of dedicated research in light of the circumstances of the prior art described above, the present inventors have found that the intended aqueous ink composition for a ballpoint pen can be obtained by setting an average particle size and a content of titanium oxide used to be within a specific range while setting a physical property and a content of urethane particles used to be within a specific range, and thus completed the present invention.

That is, the aqueous ink composition for a ballpoint pen according to the present invention contains at least 1 to 35 mass % of titanium oxide having an average particle size of greater than 0.1 μm and smaller than or equal to 1 μm and from 1 to 35 mass % of non-tacky urethane particles having an average particle size from 0.1 μm to 6 μm.

An aqueous ballpoint pen according to the present invention is characterized by loading with the ink composition for an aqueous ballpoint pen described above.

In the present invention, "non-tacky" refers to the property that the individual urethane particles exhibit so poor tackiness that the urethane particles fail to bond together in an ink composition, as well as the property that the urethane particles fail to have a film-forming property when an ink is fixed on a writing surface or the like by writing or the like.

Advantageous Effects of Invention

The present invention provides an aqueous ink composition for a ballpoint pen, the composition having excellent ink discharging performance even if a pen point is exposed for a long period of time, as well as an aqueous ballpoint pen.

DESCRIPTION OF EMBODIMENTS

An embodiment of the present invention is described below in detail. An aqueous ink composition for a ballpoint pen according to the present invention contains at least from 1 to 35 mass % of titanium oxide having an average particle size of greater than 0.1 μm and smaller than or equal to 1 μm and from 1 to 35 mass % of non-tacky urethane particles having an average particle size from 0.1 μm to 6 μm.

The titanium oxide used in the present invention, which is used as a white colorant having a masking property, is not limited as long as it is the titanium oxide having an average particle size of greater than 0.1 μm and smaller than or equal to 1 μm. The titanium oxide used in the present invention may have a spherical or irregular shape and may be surface-treated with, for example, alumina or siloxane.

In the present invention, "average particle size" refers to the value of the particle size at 50% cumulative volume in the particle size distribution (D50) calculated based on the volume measured by a laser diffraction method. Here, the measurement of average particle size by a laser diffraction method can be performed using, for example, a particle size distribution analyzer HRA 9320-X100 which is available from Nikkiso Co., Ltd.

The titanium oxide that can be used has an average particle size of greater than 0.1 μm and smaller than or equal to 1 μm, preferably greater than or equal to 0.2 μm and smaller than or equal to 0.6 μm.

When the average particle size of the titanium oxide used is smaller than or equal to 0.1 μm, it is not preferable because the masking capability of the titanium oxide as a colorant is insufficient. Meanwhile, when the average particle size of the titanium oxide used exceeds 1 μm, it is not preferable because dispersion performance in the ink composition becomes unstable.

Specific examples of the titanium oxide in the above range of average particle size that can be used include the following commercially available products: R-25, R-62 N, and R-38 L, available from Sakai Chemical Industry Co., Ltd.; Ti-Pure TS-6300, Ti-Pure TS-900, Ti-Pure R-706, and Ti-Pure R-931, available from Chemours Kabushiki Kaisha; and R-630, R-550, and R-980, available from Ishihara Sangyo Kaisha, Ltd.

The content of these titanium oxides is preferably 1 to 35 mass % (hereinafter, "mass %" is referred to as "%"), preferably 6 to 24%, relative to the total amount of the ink composition.

When the content of the titanium oxide is less than 1%, it is not preferable because the masking capability of the titanium oxide as a colorant is insufficient. Meanwhile, when the content of the titanium oxide exceeds 30%, the viscosity increases, and the outflow of an ink decreases.

The urethane particles used in the present invention are non-tacky urethane particles having an average particle size from 0.1 μm to 6 μm. Known urethane particles include tacky and non-tacky urethane particles. In a known aqueous ink composition for a ballpoint pen, it is proposed to use a tacky urethane resin emulsion to form a film by tackiness (formation of handwriting fixability and abrasion resistance). However, the present invention uses non-tacky urethane particles, that is, the individual urethane particles have poor tackiness, the urethane particles fail to bond with each other in the ink composition, and the urethane particles fail to have a film-forming property when an ink is fixed on a writing surface by writing or the like. By using such non-tacky urethane particles, an aqueous ink composition for a ballpoint pen containing titanium oxide having the aforementioned average particle size can exhibit excellent ink discharging performance even when a pen point is exposed for a long period of time.

Note that, other than urethane particles, it is known that polyethylene particles, acrylic particles, styrene acrylic hollow particles, melamine particles, and the like are used in an aqueous ink composition for a ballpoint pen; however, the effect of the present invention cannot be exhibited when the urethane particles having the above characteristics are not used.

Furthermore, while the average particle size of the urethane particles used is preferably from 0.1 µm to 6 µm, the lower limit is preferably 0.3 µm or greater and more preferably 0.7 µm or greater. The upper limit is preferably 3.0 µm or smaller and more preferably 2.0 µm or smaller. When the average particle size of the urethane particles used is smaller than 0.1 µm, sufficient effect of the invention cannot be obtained; and when the average particle size exceeds 6 µm, it is not preferable because the particles become difficult to be stably dispersed, and tend to be clogged inside a tip.

Any urethane particles may be used in the present invention as long as they are non-tacky and have the aforementioned average particle size as described above. Furthermore, the urethane particles used in the present invention may be a commercially available product or produced by a production method described below as long as they have those characteristics. Also, the urethane particles may be colored (colored urethane particles) or may be urethane particles with a pigment such as titanium oxide or carbon black encapsulated therein (pigment-encapsulated urethane particles) as long as the urethane particles have the characteristics described above.

When the urethane particles are colored and used as a coloring material (colorant), the amount of addition can be reduced thanks to good color development. The colored urethane particles exert the effect of the present invention while functioning as a colorant, improving the degree of freedom of ink formulation. Meanwhile, urethane particles with a pigment encapsulated therein (pigment-encapsulated urethane particles), as well as the effect of the present invention, have better dispersion performance than that with a pigment directly dispersed in an ink while the pigment is difficult to be dispersed. Furthermore, urethane particles with titanium oxide encapsulated therein have the same masking property as titanium oxide, making it possible to obtain a hand-drawn line having higher masking property.

The urethane particles used are polymers or copolymers having a urethane bond, and are obtained by reacting an isocyanate component (including a diisocyanate component) with a polyol component (including a diol component). Examples of the urethane particles used include at least one of urethane particles (such as polyester urethane particles, polycarbonate urethane particles, and polyether urethane particles) and urethane-urea particles.

Preferably, the urethane particles used are obtained by the following production method.

The production of the urethane particles can be carried out by 1) preparing an oil phase containing an organic solvent, an isocyanate monomer or an isocyanate prepolymer, and, when coloring the urethane particles, a colorant; 2) preparing an aqueous phase by mixing water and a dispersant; and 3) mixing the oil phase and the aqueous phase to emulsify components of the oil phase and then polymerizing.

The oil phase contains an organic solvent, an isocyanate monomer or an isocyanate prepolymer, and, when coloring the urethane particles, a colorant (such as a dye or a pigment). A plurality of the organic solvents may be included.

The oil phase can be prepared by: heating an organic solvent to a predetermined temperature while stirring and, when coloring the urethane particles, adding a colorant; then, adding the aforementioned monomer or prepolymer and, optionally, another organic solvent.

Examples of the organic solvent include phenyl glycol, benzyl alcohol, ethylene glycol monobenzyl ether, and ethyl acetate. Additional examples include alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin.

Examples of the isocyanate monomer or prepolymer include hexamethylene diisocyanate, tolylene diisocyanate, diphenylmethane diisocyanate, xylylene diisocyanate, isophorone diisocyanate, and an isocyanate prepolymer.

From the perspective of curing favorably by polymerization, the isocyanate prepolymer is preferably a trimer such as a triol adduct or an isocyanurate-modified product of the isocyanate described above. In addition to the trimer described above, a dimer such as an allophanate-modified product of the isocyanate described above can be used as an auxiliary prepolymer.

In this method, the hardness of the urethane particles can be adjusted by, for example, the selection of the isocyanate component (a monomer or a prepolymer, an auxiliary monomer, an auxiliary prepolymer) or the adjustment of the content of the isocyanate component contained. In addition, the average particle size of the urethane particles can be adjusted by controlling a stirring condition during the polymerization.

Various dyes, pigments, and the like can be used as the colorant to prepare the colored urethane particles. Examples of the dye that can be used include a water-insoluble dye that is insoluble in water at room temperature, and specific examples include a salt-forming dye, a disperse dye, or an oil-soluble dye. From the perspective of color development, the use of a salt-forming dye is preferable.

Examples of the salt-forming dye include a dye having an azo structure, a metal complex salt azo structure, an anthraquinone structure, and a metal phthalocyanine structure, such as Valifast (trade name) Black 1807, Valifast (trade name) Blue 2620, Valifast (trade name) Brown 2402, Valifast (trade name) Green 1501, Valifast (trade name) Orange 2210, Valifast (trade name) Pink 2310, Valifast (trade name) Red 1355, Valifast (trade name) VIOLET 1701, and Valifast (trade name) Yellow 1101, all available from Orient Chemical Industries Co., Ltd.

At least one dye selected from the following examples can be used as the disperse dye: C. I. Disperse Yellow 198, C. I. Disperse Yellow 42, C. I. Disperse Red 92, C. I. Disperse Violet 26, C. I. Disperse Violet 35, C. I. Disperse Blue 60, and C. I. Disperse Blue 87.

Examples of the oil-soluble dye include Oil Black 860, Oil Blue 613, Oil Brown BB, Oil Green 530, Oil Orange 201, Oil Pink 312, Oil Red 5B, Oil Scarlet 318, and Oil Yellow 105, all available from Orient Chemical Industries Co., Ltd.

The water phase can be prepared by mixing water and a dispersant. Examples of the dispersant include, but not limited to, polyvinyl alcohol.

The emulsification and polymerization step, that is, emulsifying the components of the oil phase and then polymerizing, can be performed by introducing the oil phase into the aqueous phase and subjecting the mixture to emulsification mixing using a homogenizer or the like under heating to a predetermined temperature; this results in colored urethane particles or uncolored urethane particles.

Furthermore, in addition to the emulsification polymerization described above, the urethane particles may be produced by a phase separation method. The phase separation method includes: preparing a dye-containing solution when coloring the urethane particles, preparing a solution containing a protective colloid agent, and polymerizing an isocyanate monomer or isocyanate.

The dye-containing solution can be prepared by dissolving a water-insoluble dye in an organic solvent under heating. An organic solvent used in the emulsification polymerization described above can be used as the water-insoluble dye and the organic solvent.

The protective colloid agent-containing solution can be prepared by dissolving a protective colloid agent in water. Examples of the protective colloid agent include a methyl vinyl ether-maleic anhydride copolymer.

Polymerization of the isocyanate monomer or isocyanate prepolymer can be performed by, when coloring the urethane particles, dispersing a dye-containing solution in the form of oil droplets in a protective colloid agent-containing solution that has been heated to a predetermined temperature, adding the aforementioned isocyanate monomer or isocyanate prepolymer to the dispersion, and stirring while maintaining the temperature.

Examples of commercially available urethane particles having the characteristics described above that can be used include ART PEARL CE-800 T (non-tacky, average particle size is 6 μm), ART PEARL MN-101SWA (non-tacky, average particle size is 0.2 μm), and ART PEARL MM-120 T (non-tacky, average particle size is 2 μm), all available from Negami Chemical Industrial Co., Ltd.

The urethane particles with a pigment encapsulated therein that can be used are microcapsule urethane particles with, for example, carbon black, a phthalocyanine pigment, a quinacridone pigment, as well as titanium oxide or zinc oxide encapsulated therein, such as microcapsule urethane particles produced by subjecting particles containing at least an aforementioned pigment to microencapsulation, or specifically, by encapsulating particles containing at least an aforementioned pigment in a shell layer (shell) composed of a wall film forming substance (wall material) made from a urethane resin to prepare particles having the predetermined average particle size described above.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

The urethane (polyurethane resin), urea (polyurea resin), and urea-urethane (polyurea resin/polyurethane resin) used in the formation of the shell layer are formed by reacting an isocyanate component with an amine component or an alcohol component, or the like.

Concerning the formation of the shell layer using urethane, urea, or urea-urethane, the shell layer can be formed, for example, by one of the following production methods: 1) Interfacial polymerization between: a monomer component of at least one among urethane, urea, and urea-urethane; and an aforementioned pigment such as titanium oxide or carbon black. 2) Similar to the above method for producing colored urethane particles, a production method including an emulsification step and an interfacial polymerization step, the emulsification step being dispersing an oily component (oil phase) containing an isocyanate component and a predetermined amount (for example, from 5 to 50 mass % in particles) of a pigment in an aqueous solvent (aqueous phase) to produce an emulsified liquid, and the interfacial polymerization step being adding, to the emulsified liquid, at least one of an amine component and an alcohol component to perform interfacial polymerization.

These urethane particles (such as uncolored urethane particles, colored urethane particles, or pigment-encapsulated urethane particles) can be used alone or as a mixture of two or more types. The content of such urethane particles is from 1 to 35% and preferably from 3 to 18%, relative to the total amount of the ink composition.

When the content of urethane particles having the characteristics is less than 1%, the effect of the present invention cannot be exhibited; and, when the content of urethane particles having the characteristics is more than 35%, stability of the ink decreases. Thus, both cases are not preferable.

The aqueous ink composition for a ballpoint pen according to the present invention contains at least from 1 to 35 mass % of titanium oxide having the aforementioned characteristics and from 1 to 35 mass % of urethane particles having the aforementioned characteristics. In addition to these components, the aqueous ink composition for a ballpoint pen according to the present invention may further contain, for example, a coloring material such as another pigment or dye, a water-soluble organic solvent, and, as a balance, water (such as tap water, purified water, distilled water, ion-exchanged water, or pure water) which is a solvent, and furthermore, optionally, various components which are commonly used in an aqueous ink composition for a writing instrument, such as a thickener, a lubricant, a corrosion inhibitor, a preservative or antibacterial agent, a pH modifier, or a pigment dispersant, in an appropriate amount within a range that does not impair the effect of the present invention.

In the present invention, in addition to the urethane particles that are colored and the pigment-encapsulated urethane particles as described above, a coloring material (colorant) such as another pigment or dye can be used as a complementary color component, as necessary. Examples of the coloring material that can be used, in an appropriate amount within a range that does not impair the effect of the present invention, include a dye that is dissolved or dispersed in water, a known inorganic and organic pigment, a pigment in which a base material, such as silica or mica, is coated on the surface layer with iron oxide, titanium oxide or the like in multiple layers.

Examples of the dye include an acid dye such as Eosin, Phloxine, Water Yellow #6-C, Acid Red, Water Blue #105, Brilliant Blue FCF, Nigrosine NB; a direct dye such as Direct Black 154, Direct Sky Blue 5B, Violet B00B; and a basic dye such as rhodamine and methyl violet.

Examples of the organic pigment include azo lake, an insoluble azo pigment, a chelate azo pigment, a phthalocyanine pigment, a perylene and perinone pigment, and a nitroso pigment. Specific examples include: inorganic pigments, such as carbon black, titanium black, zinc oxide, colcothar, chromium oxide, iron black, cobalt blue, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine blue, precipitated barium sulfate, barite powder, calcium carbonate, white lead, prussian blue, manganese violet, and brass powder; and organic pigments, such as C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

These coloring materials may be used alone or in a combination of two or more.

Examples of the water-soluble organic solvent that can be used include: glycols such as ethylene glycol, diethylene glycol, triethylene glycol, propylene glycol, polyethylene glycol, 3-butylene glycol, thiodiethylene glycol, and glycerin; ethylene glycol monomethyl ether; and diethylene glycol monomethyl ether. These water-soluble organic solvents may be used alone or as a mixture of two or more.

The content of these water-soluble organic solvents is adjusted as appropriate depending on the application of the aqueous ink composition for a writing instrument and is in a range of 1% to 30% relative to the total amount of the ink composition.

The thickener that may be used herein is preferably, for example, at least one type selected from the group consisting of synthetic polymers, cellulose, and polysaccharides. Specific examples include gum arabic, tragacanth gum, guar gum, locust bean gum, alginic acid, carrageenan, gelatin, xantan gum, welan gum, succinoglycan, dietheutan gum, dextran, methyl cellulose, ethyl cellulose, hydroxyethyl cellulose, carboxymethyl cellulose, starch glycolic acid and salts thereof, polyvinyl pyrrolidone, polyvinylmethyl ether, polyacrylic acid and salts thereof, polyethylene oxide, vinyl acetate-polyvinyl pyrrolidone copolymers, and styrene-acrylic acid copolymers and salts thereof.

Examples of the lubricant include non-ionic types such as fatty acid esters of polyhydric alcohols, higher fatty acid esters of saccharides, and polyoxyalkylene higher fatty acid esters; anionic types such as phosphates, alkyl sulfonates of higher fatty acid amides, and alkyl aryl sulfonates; derivatives of polyalkylene glycols, fluorochemical surfactants, and polyether modified silicones; these can also be used as surface treatment agents for pigments.

Examples of the corrosion inhibitor include benzotriazol, tolyltriazole, dicyclohexyl ammonium nitrite, and saponins. Examples of the preservative or antifungal agent include and phenol, omadine sodium, sodium benzoate, benzoisothiazolin, and benzimidazole compounds. Examples of the pH modifier include hydroxides of alkali metals such as sodium hydroxide, potassium hydroxide, and lithium hydroxide; amine compounds such as triethanolamine, diethanolamine, monoethanolamine, dimethylethanolamine, morpholine, and triethylamine; and ammonia. Examples of the pigment dispersant include styrene acrylic copolymers and polymeric polycarboxylic acids.

The aqueous ink composition for a ballpoint pen according to the present invention can be prepared by combining at least from 1 to 35 mass % of titanium oxide having the aforementioned characteristics and from 1 to 35 mass % of urethane particles having the aforementioned characteristics with optional components as appropriate depending on, for example, the ballpoint pen structure, stirring and mixing using a stirrer such as a homomixer, a homogenizer, or a disperser, and optionally, filtering or centrifuging the mixture to remove coarse particles in the ink composition.

The resulting aqueous ink composition for a ballpoint pen according to the present invention is used in a ballpoint pen provided with a ballpoint pen tip.

The reason that the aqueous ink composition for a ballpoint pen according to the present invention configured in this manner improves deterioration of ink discharging performance that happens when the cap of a ballpoint pen is taken off for a certain period of time by using an ink composition having titanium oxide is speculated as the followings. The aqueous ink composition for a ballpoint pen according to the present invention contains at least from 1 to 35% of titanium oxide having the aforementioned characteristics and from 1 to 35% of urethane particles having the aforementioned characteristics. By containing from 1 to 35% of non-tacky urethane particles having a predetermined average particle size, it is inferred that the aggregation of titanium oxide particles is suppressed, and a dry film that is instantly disintegrated due to rotation of the ball is formed, resulting in an aqueous ink composition for a ballpoint pen having excellent ink discharging performance.

Note that, the specific action and effect of the present invention described above can only be exhibited by including the urethane particles having the characteristics described above in an aqueous ink composition for a ballpoint pen containing titanium oxide; meanwhile, when known polyethylene particles, acrylic particles, tacky urethane particles, and the like are used in a known aqueous ink composition for a ballpoint pen containing titanium oxide, the effect of the present invention cannot be exhibited (these are described in detail in the examples and comparative examples described below).

An aqueous ballpoint pen according to the present invention includes, for example, an instrument where an aqueous ink composition for a ballpoint pen having the aforementioned composition is accommodated in an ink container (refill) for a ballpoint pen, and where a material is accommodated as an ink follower, the material being not compatible with the aqueous ink composition accommodated in the ink container while having a small specific gravity with respect to the aqueous ink composition, such as at least one among polybutene, silicone oil, and mineral oil.

Note that the structure of the ballpoint pen is not limited, and the ballpoint pen may be, for example, an aqueous ballpoint pen having various structures including a retractable system, or a direct liquid type ballpoint pen provided with a collector structure (ink holding mechanism) using a barrel itself as an ink container filled with the aqueous ink composition for a ballpoint pen having the composition described above.

Furthermore, the material, size (inner diameter, length), and the like of a ball holder, an ink containing tube, a joint member (front barrel), and the like are set as appropriate depending on the tip structure, the ball diameter, the ink follower, and the like.

The aqueous ballpoint pen of the present invention configured as described above is an aqueous ballpoint pen having excellent ink discharging performance by using the aqueous ink composition for a ballpoint pen having the characteristics described above.

EXAMPLES

Next, the present invention will be described in more detail using Production Example 1 to 3 (preparation of urethane particles 1 to 3 within the scope of the present invention), Examples, and Comparative Examples (preparation of aqueous ink composition for a ballpoint pen), but the present invention is not limited by the following Examples and the like.

Production Example 1: Urethane Particles 1

To prepare an oil phase solution, while heating 12.5 parts by mass of ethyl acetate to 60° C., 0.5 parts by mass of a terpene phenol resin (YS Polystar N125, available from Yasuhara Chemical Co., Ltd.) was added to ethyl acetate and sufficiently dissolved. Next, 8 parts by mass of an isocyanurate-modified product of hexamethylene diisocyanate as a prepolymer (TLA-100, available from Asahi Kasei Corporation) was added, resulting in an oil phase solution.

To prepare an aqueous phase solution, while heating 200 parts by mass of distilled water to 60° C., 15 parts by mass of polyvinyl alcohol (PVA-205, available from Kuraray Co., Ltd.) as a dispersant was dissolved in the distilled water, resulting in an aqueous phase solution.

The oil phase solution was added to the water phase solution at 60° C., and stirred with a homogenizer for 6 hours for emulsion polymerization, thus completing polymerization.

By subjecting the obtained dispersion to centrifugation, urethane particles (uncolored) 1 were obtained.

Production Example 2: Urethane Particles 2

To prepare an oil phase solution, while heating 12.5 parts by mass of ethyl acetate to 60° C., 3.5 parts by mass of an oil-soluble black dye (Oil Black 860, available from Orient Chemical Industries Co., Ltd.) and 0.5 parts by mass of a terpene phenol resin (YS Polystar N125, available from Yasuhara Chemical Co., Ltd.) were added to ethyl acetate and sufficiently dissolved. Next, 8 parts by mass of an isocyanurate-modified product of hexamethylene diisocyanate as a prepolymer (TLA-100, available from Asahi Kasei Corporation) was added, resulting in an oil phase solution.

To prepare an aqueous phase solution, while heating 200 parts by mass of distilled water to 60° C., 15 parts by mass of polyvinyl alcohol (PVA-205, available from. Kuraray Co., Ltd.) as a dispersant was dissolved in the distilled water, resulting in an aqueous phase solution.

The oil phase solution was added to the water phase solution at 60° C., and stirred with a homogenizer for 6 hours for emulsion polymerization, thus completing polymerization.

By subjecting the obtained dispersion to centrifugation, urethane particles (black particles) 2 were obtained.

Production Example 3: Urethane Particles 3

To prepare an oil phase solution, while heating 17 parts of triethylene glycol distearate to 65° C., 4 parts of titanium oxide (Ti-Pure TS-6300, available from Chemours Kabushiki Kaisha) was added to triethylene glycol distearate and sufficiently dissolved. Next, 4 parts of methyl ethyl ketone was added, and 7 parts of a trimethylolpropane-modified product of xylylene diisocyanate (D-110N, manufactured by Mitsui Chemicals, Inc.) were further added. The solution was stirred at 65° C. As an aqueous phase solution, 15 parts of polyvinyl alcohol (PVA-205, manufactured by Kuraray Co., Ltd.) was dissolved in 600 parts of distilled water warmed to 65° C., and the above-mentioned oil phase solution was added to this solution, and 6 parts of hexamethylene diamine was further added. The solution mixture was subjected to emulsification to complete polymerization.

By subjecting the obtained dispersion to centrifugation, urethane particles (titanium oxide-encapsulated urethane particles) 3 were obtained.

Preparation of Aqueous Ink Composition for Ballpoint Pen

Examples 1 to 8 and Comparative Examples 1 to 4

Aqueous ink compositions for a ballpoint pen (total amount 100% by mass) were prepared by an ordinary method in accordance with the composition shown in Table 1 below, which include three types of titanium oxide, five types of urethane particles within the scope of the present invention, including the aforementioned urethane particles 1 to 3 obtained above, as well as three types of other particles (polyethylene particles, acrylic particles, tacky urethane particles) outside the scope of the present invention, a thickener, a lubricant (phosphate ester), a preservative, a corrosion inhibitor, a pH adjusting agent, a pigment dispersant, a water-soluble organic solvent, and water. The average particle size (μm) of the titanium oxide particles and the urethane particles used was measured using a particle size distribution analyzer HRA 9320-X100, which is available from Nikkiso Co., Ltd.

The obtained aqueous ink compositions for a writing instrument were evaluated for ink discharging performance using an aqueous ballpoint pen having the following configuration according to the following evaluation method.

These results are shown in Table 1 below.

Preparation of Aqueous Ballpoint Pen

Each of the aqueous ink compositions for a ballpoint pen of Examples 1 to 8 and Comparative Examples 1 to 4 was filled into a refill consisting of a polypropylene ink containing tube (having an inner diameter of 4 mm and a length of 113 mm), a stainless steel tip (having a hard-metal alloy ball with a ball diameter of 0.5 mm), and a joint connecting the containing tube and the tip. The rear end of the ink was then loaded with an ink follower made of mineral oil, polybutene, and an olefin elastomer. Each of the refills was loaded into the barrel of a ballpoint pen (UM-151, available from Mitsubishi Pencil Co., Ltd.) to prepare an aqueous ballpoint pen.

Evaluation Method for Ink Discharging Performance

After leaving these aqueous ballpoint pens to stand for 1 month at 25° C. and 50% RH without a cap, straight lines were drawn on PPC paper using these aqueous ballpoint pens, and the ink discharging performance was evaluated according to the following evaluation criteria.

Evaluation criteria:
A: Writable without problem from beginning of writing
B: Blurring of less than 20 mm is observed from the start of writing
C: Blurring of 20 mm or more is observed from the start of writing

TABLE 1

(Total amount: 100 mass %)

| | | Examples | | | | | | | |
|---|---|---|---|---|---|---|---|---|---|
| | | 1 | 2 | 3 | 4 | 5 | 6 | 7 | 8 |
| Titanium Oxide | Ti-Pure TS-6300 (average particle size is 0.53 μm) (Available from Chemours) | 10 | | | 10 | | | 5 | 25 |
| | R-25 (average particle size of 0.2 μm) (Available from Sakai Chemical) | | 20 | | | | | | |
| | Ti-Pure R-900 (average particle size of 0.41 μm) (Available from Chemours) | | | 15 | | 15 | 15 | | |
| Urethane Particles | Urethane Particles 1 (average particle size of 1.2 μm) | 20 | | 15 | | | | 25 | 5 |
| | Urethane Particles 2 (colored: average particle size of 1.4 μm) | | 10 | | | | | | |
| | Urethane Particles 3 (titanium oxide-encapsulated) (average particle size of 1.6 μm) | | | | 20 | | | | |
| | ART PEARL CE-800 T (average particle size of 6 μm) (available from Negami Chemical) | | | | | 15 | | | |
| | ART PEARL MM-101SWA (average particle size of 0.2 μm, solid content of 30%) (available from Negami Chemical) | | | | | | 50 | | |
| Other Particles | CHEMIPEARL W-401 (average particle size of 1 μm, polyethylene) (available from Mitsui Chemicals) | | | | | | | | |
| | ART PEARL J-4PY (average particle size of 2.2 μm, acrylic) (available from Negami Chemical) | | | | | | | | |
| | PERMARIN UA-368 T (average particle size of 0.21 μm, solid content of 50%, tacky urethane emulsion) (available from Sanyo Chemical) | | | | | | | | |
| Thickener | Xantan gum KELSAN S (available from Sansho) | 0.32 | 0.32 | 0.32 | 0.32 | 0.32 | 0.32 | 0.32 | 0.32 |
| Phosphate ester | PLYSURF A219B (available from DKS) | 0.5 | 0.5 | 0.5 | 0.5 | 0.5 | 0.5 | 0.5 | 0.5 |
| Preservative | Bioden 421 (available from Nippon Soda) | 0.2 | 0.2 | 0.2 | 0.2 | 0.2 | 0.2 | 0.2 | 0.2 |
| Corrosion inhibitor | Benzotriazol | 0.3 | 0.3 | 0.3 | 0.3 | 0.3 | 0.3 | 0.3 | 0.3 |
| pH modifier | Aminomethyl Propanol | 0.1 | 0.1 | 0.1 | 0.1 | 0.1 | 0.1 | 0.1 | 0.1 |
| Pigment Dispersant | MARIALIM SC-0505K (available from NOF) | 0.5 | 0.5 | 0.5 | 0.5 | 0.5 | 0.5 | 0.5 | 0.5 |
| Water-soluble Organic Solv. | Propylene glycol | 15 | 15 | 15 | 15 | 15 | 15 | 15 | 15 |
| Water | Ion exchanged water | 53.08 | 53.08 | 53.08 | 53.08 | 53.08 | 18.08 | 53.08 | 53.08 |
| Ink Discharging Performance Evaluation | | A | A | A | A | A | A | A | A |

TABLE 2

(Total amount: 100 mass %)

| | | Comparative Examples | | | |
|---|---|---|---|---|---|
| | | 1 | 2 | 3 | 4 |
| Titanium Oxide | Ti-Pure TS-6300 (average particle size is 0.53 μm) (Available from Chemours) | 10 | | | |
| | R-25 (average particle size of 0.2 μm) (Available from Sakai Chemical) | | 20 | | |
| | Ti-Pure R-900 (average particle size of 0.41 μm) (Available from Chemours) | | | 15 | 15 |

TABLE 2-continued (Total amount: 100 mass %)

| | | Comparative Examples | | | |
|---|---|---|---|---|---|
| | | 1 | 2 | 3 | 4 |
| Urethane Particles | Urethane Particles 1 (average particle size of 1.2 μm) | | | | |
| | Urethane Particles 2 (colored: average particle size of 1.4 μm) | | | | |
| | Urethane Particles 3 (titanium oxide-encapsulated) (average particle size of 1.6 μm) | | | | |
| | ART PEARL CE-800 T (average particle size of 6 μm) (available from Negami Chemical) | | | | |
| | ART PEARL MM-101SWA (average particle size of 0.2 μm, solid content of 30%) (available from Negami Chemical) | | | | |
| Other Particles | CHEMIPEARL W-401 (average particle size of 1 μm, polyethylene) (available from Mitsui Chemicals) | | | 15 | |
| | ART PEARL J-4PY (average particle size of 2.2 μm, acrylic) (available from Negami Chemical) | | | | 15 |
| | PERMARIN UA-368 T (average particle size of 0.21 μm, solid content of 50%, tacky urethane emulsion) (available from Sanyo Chemical) | | 20 | | |
| Thickener | Xantan gum KELSAN S (available from Sansho) | 0.32 | 0.32 | 0.32 | 0.32 |
| Phosphate ester | PLYSURF A219B (available from DKS) | 0.5 | 0.5 | 0.5 | 0.5 |
| Preservative | Bioden 421 (available from Nippon Soda) | 0.2 | 0.2 | 0.2 | 0.2 |
| Corrosion inhibitor | Benzotriazol | 0.3 | 0.3 | 0.3 | 0.3 |
| pH modifier | Aminomethyl Propanol | 0.1 | 0.1 | 0.1 | 0.1 |
| Pigment Dispersant | MARIALIM SC-0505K (available from NOF) | 0.5 | 0.5 | 0.5 | 0.5 |
| Water-soluble Organic Solv. | Propylene glycol | 15 | 15 | 15 | 15 |
| Water | Ion exchanged water | 73.08 | 43.08 | 53.08 | 53.08 |
| | Ink Discharging Performance Evaluation | C | C | C | C |

When examining Table 1 above, it is found that, compared to Comparative Examples 1 to 4 which were outside the range of the present invention, Examples 1 to 8 which were within the range of the present invention were aqueous ink compositions exhibiting excellent ink discharging performance for a ballpoint pen after a pen point is exposed for a long period of time, which is a specific action and effect of the present invention.

Specifically, when examining each of the Examples, it is observed that an ink composition containing titanium oxide for an aqueous ballpoint pen can exhibit the aforementioned specific action and effect of the present invention in the following cases: Examples 1, 3, 7, and 8, which contained non-tacky, uncolored urethane particles having a predetermined average particle size; Examples 2 and 4, which contained non-tacky, colored urethane particles and titanium oxide-encapsulated urethane particles having a predetermined average particle size; and Examples 5 and 6, which contained commercially available, non-tacky, and uncolored urethane particles having a predetermined average particle size.

In contrast, when examining each of the Comparative Examples, it is observed that an aqueous ink composition for a ballpoint pen containing titanium oxide cannot exhibit the aforementioned specific action and effect of the present invention in the following cases: Comparative Example 1, which did not contain urethane particles; Comparative Example 2, which contained an tacky urethane emulsion; Comparative Example 3, which contained polyethylene particles; and Comparative Example 4, which contained acrylic particles.

INDUSTRIAL APPLICABILITY

An aqueous ink composition for a ballpoint pen suitable for ballpoint pens and an aqueous ballpoint pen loaded with the aqueous ink composition for a ballpoint pen are provided.

The invention claimed is:
1. An ink composition for an aqueous ballpoint pen, the ink composition comprising:
titanium oxide in a range of from 1 to 35 mass %, the titanium oxide having an average particle size in a range of from greater than 0.1 to 1 μm; and urethane particles in a range of from 1 to 35 mass %, the urethane particles having an average particle size in a range of from 0.1 to 6 μm, wherein the urethane particles are non-tacky and are a polymerization product of an isocyanate prepolymer comprising a triol adduct or an isocyanurate-modified product of an isocyanate selected from the group consisting of hexamethylene diisocyanate, tolylene diisocyanate, diphenylmethane diisocyanate, xylylene diisocyanate, and isophorone diisocyanate.

2. An aqueous ballpoint pen, comprising:
the ink composition of claim 1.

* * * * *